United States Patent
Franzen

(10) Patent No.: US 7,113,177 B2
(45) Date of Patent: Sep. 26, 2006

(54) TOUCH-SENSITIVE DISPLAY WITH TACTILE FEEDBACK

(75) Inventor: Michael Franzen, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 225 days.

(21) Appl. No.: 10/380,928

(22) PCT Filed: Sep. 5, 2001

(86) PCT No.: PCT/DE01/03402

§ 371 (c)(1),
(2), (4) Date: Mar. 18, 2003

(87) PCT Pub. No.: WO02/27645

PCT Pub. Date: Apr. 4, 2002

(65) Prior Publication Data

US 2003/0179190 A1    Sep. 25, 2003

(30) Foreign Application Priority Data

Sep. 18, 2000   (DE) ................................ 100 46 099

(51) Int. Cl.
  *G09G 5/00*   (2006.01)
(52) U.S. Cl. .................................... 345/173; 178/18.01
(58) Field of Classification Search ........ 345/173–183; 178/18.01, 18.02, 18.04, 18.1, 19.01, 19.04
See application file for complete search history.

(56) References Cited

U.S. PATENT DOCUMENTS

| | | |
|---|---|---|
| 4,885,565 A | 12/1989 | Embach |
| 5,412,189 A | 5/1995 | Cragun |
| 5,977,867 A | 11/1999 | Blouin |
| 6,118,435 A | 9/2000 | Fujita et al. |
| 6,146,332 A * | 11/2000 | Pinsonneault et al. ...... 600/534 |
| 6,337,678 B1 * | 1/2002 | Fish .......................... 345/156 |
| 6,429,846 B1 * | 8/2002 | Rosenberg et al. ......... 345/156 |
| 6,819,312 B1 * | 11/2004 | Fish .......................... 345/156 |

FOREIGN PATENT DOCUMENTS

| | | |
|---|---|---|
| DE | 3814017 | 9/1989 |
| DE | G 93 04 033.4 | 10/1993 |
| DE | 298 15 222 | 3/1999 |
| DE | 198 10 125 | 6/1999 |
| DE | 199 62 552 | 7/2001 |
| EP | 556999 A1 * | 8/1993 |
| JP | 11161153 A * | 6/1999 |
| JP | 2002236543 A * | 8/2002 |
| JP | 2003288158 A * | 10/2003 |

* cited by examiner

*Primary Examiner*—Amr A. Awad
*Assistant Examiner*—Tom Sheng
(74) *Attorney, Agent, or Firm*—Bell, Boyd & Lloyd LLC

(57) ABSTRACT

A touch-sensitive display with tactile feedback is provided which includes a first layer with a mechanically flexible display medium, a second layer with a least one receptor, wherein the second layer is disposed in such a way that the receptor detects a contact in at least one section of the first layer and generates at least one first signal, a third layer with at least one controllable actuator, wherein the third layer is disposed in such a way that the controllable actuator mechanically manipulates the first layer at least in some points of the section, and a control device which contacts the second layer and the third layer in such a way that, in an initial stage, at least one second signal for controlling the actuator is generator, and at least one modified second signal is generated on the basis of the first signal.

10 Claims, 1 Drawing Sheet

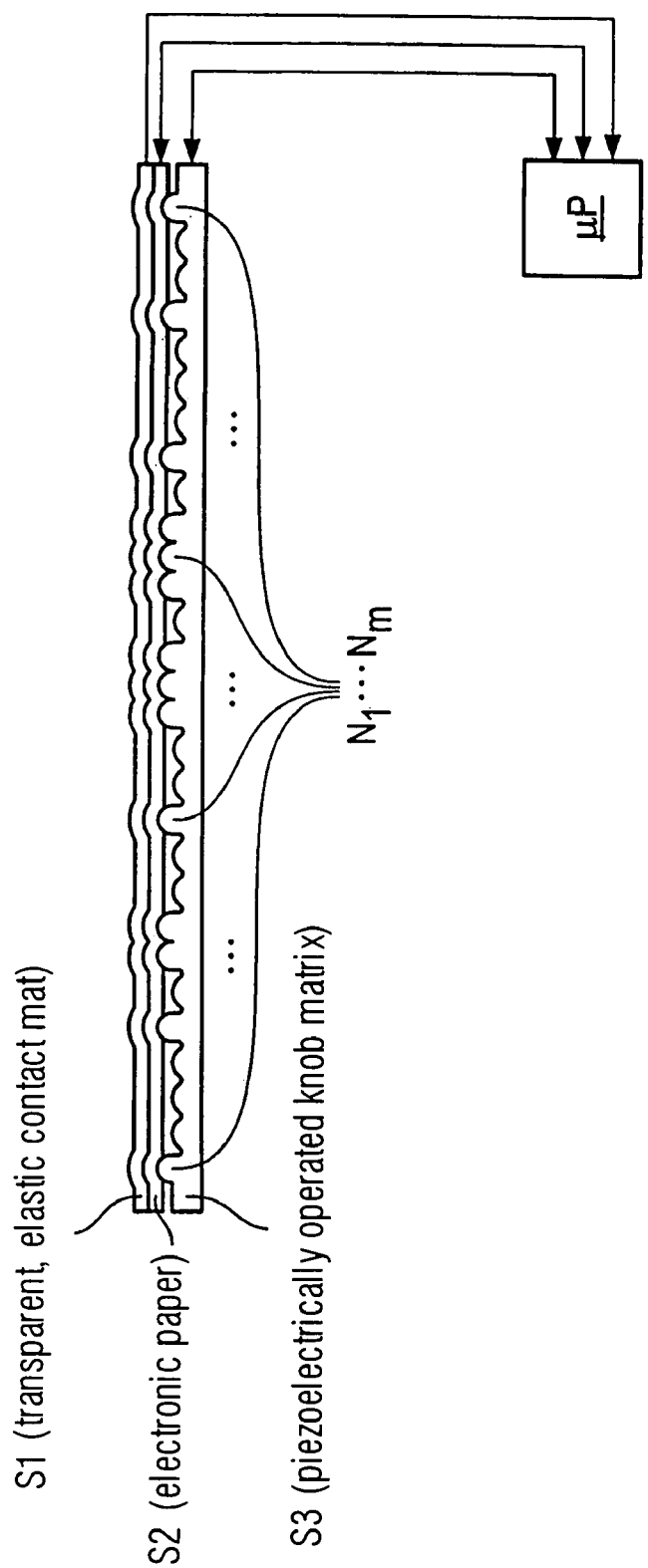
Sole Figure

TOUCH-SENSITIVE DISPLAY WITH TACTILE FEEDBACK

BACKGROUND OF THE INVENTION

Touch-sensitive displays, or "touchscreens," are used predominantly in so-called touchscreen terminals which can be operated by a user touching the screen with a finger, whereby the keyboard and mouse known from the PC are generally dispensed with.

A confirmation that an input effected by a user has actually taken place is, in general, obtained by means of audiovisual feedback; for example, by means of a beep sound or a change of color of the display area when the display is touched.

Touchscreen terminals are set up at trade fairs, presentations or in the reception areas of companies in order to enable dialog with customers. Touchscreen terminals also can be found at airports and in city centers as information terminals for tourists, and in manufacturing facilities for data entry and control purposes in production processes.

One disadvantage experienced with the above mentioned applications are loud and irregularly occurring ambient noises which occur at airports and in streets and production facilities, with the result that there is a danger of audible feedback being masked by the ambient noises and going unnoticed by the user.

Visual feedback is similarly dependent on ambient influences. For example, direct or reflected sunlight can cause irritation, with the result that the visual feedback does not achieve the desired effect. In addition, situations also occur whereby users obscure areas of the display intended for the visual feedback with their hand.

Furthermore, a touch-sensitive monitor is known from U.S. Pat. No. 4,885,565, in which tactile feedback is initiated when an input is made by a user touching the screen. To this end an oscillating coil is driven in such a way by a microprocessor that it triggers a mechanical stimulus which causes the housing of the monitor to vibrate so that the user can also feel that his/her input has been detected in addition to receiving the audiovisual feedback.

The disadvantage of this solution is that regardless of which input has been made by the user touching the screen, the same tactile feedback always occurs and a differentiation is only possible when taken in conjunction with the audiovisual feedback which is still present as before.

An object to which the present invention is directed is, therefore, to set down a touch-sensitive display with tactile feedback which resolves the disadvantages of the prior art.

SUMMARY OF THE INVENTION

According to the present invention, a touch-sensitive display with tactile feedback has a first mechanically flexible layer which is designed such that it functions as a display, such as, a membrane known as electronic paper, a second layer having at least one receptor, a third layer having at least one controllable actuator, whereby the second layer is disposed in such a way that the receptor detects a contact in at least one section of the first layer and generates at least one first signal, and whereby the third layer is disposed in such a way that the controllable actuator mechanically manipulates the first layer at least in some points of the section, and also a control device which is designed and contacted with the second layer and the third layer in such a way that, in an initial state, at least one second signal for controlling the actuator is generated, whereby at least one modified second signal is generated on the basis of the first signal.

The display according to the present invention enables the detection of a contact with the display via the receptor, whereby a tactile feedback is given directly at the location of the contact, at which (for example, in the case of a virtual keypad represented on the display which can be operated by pressing on the corresponding position of the display), for each of the keys represented in the keypad a tactile delimitation and/or a keyboard label is implemented via an actuator, which is also useful, in particular, with regard to the implementation of a terminal for visually impaired or blind persons. It is conceivable, for example, that the keyboard and labels are displayed for sighted persons while at the same time an output is generated in Braille for blind persons via the actuator beneath the displayed key.

By exercising appropriate control (software), in order to get closer to the impression of a real keyboard it is possible to generate the feeling of the virtual key yielding or locking and it is even possible to simulate a slider control in that a virtual key representing a slider control follows the key being touched or dragged, whereby the surface of a slider control of this type could be generated, in particular, to be rough so as to give a good grip. As a result of the display according to the present invention, the user receives an intuitive level of feedback which offers the user a greater degree of confidence when handling a touch-sensitive display and minimizes or neutralizes the influence of disruptive noise and lighting conditions.

Particularly suitable for use as the first layer are display media which are designed in accordance with the "electronic paper," "microencapsulated electrophoretic display" or "organic electro-luminescence" technologies since these are very thin and, designed as a flexible membrane, yield to mechanical forces, such as are generated by the actuator which, in particular, act in localized fashion on the membrane surface. In this situation, the membrane is designed to be elastic in such a way that it returns to the initial state prior to the effect of the mechanical force as soon as the force effect is removed.

An embodiment of the receptor as a light grid enables the indirect detection of contacts since such a light grid situated just above the first layer simply detects the location at which a user interrupts the light of the grid, with his/her finger for example, in order to touch a virtual key. Furthermore, this embodiment offers the advantage that the second layer is formed by the air, which is limited only by the facilities used to implement the light grid, with the result that the actuator experiences no additional resistance when performing mechanical manipulation in localized fashion and requires little drive energy.

The embodiment of the actuator as a matrix arrangement of electrically and/or magnetically driven pins permits the generation of a roughness and good grip characteristic for the virtual keys, and is particularly suitable for implementation of the output of a text display for blind persons.

A matrix of movable pins lying perpendicular to the display as a receptor is suitable for simulating the locking or yielding to a key depression. The detection of a virtual slider control is also simple to implement with this embodiment since only the state of adjacent pins needs to be checked in order to determine the direction of slider movement.

Arranging pins of the actuator matrix and the receptor matrix in alternation beside one another on the same level (layer) saves space.

Even more advantageous is an embodiment whereby the pins simultaneously fulfill the dual functions of actuator and receptor. In this way, the delimitation or labeling of a virtual key can be generated in an effective and space-saving manner (pins extended), whereby pressing (in) the pins enables detection of the contact on the one hand and the yielding or locking on the other. In addition, as a result of having the receptor and actuator functions in the same location, a more precise association between the detected contact point and the displayed virtual information is possible.

Piezoelectric elements are particularly suitable for drive purposes and for the detection of contacts since they are able to directly convert voltages (signals), generated by microprocessors for example, into pressure or movement and, in the opposite direction, pressure into voltages (signals) which can be immediately processed further by microprocessors.

Electromagnetic elements are known, just like the piezoelectric elements, for the implementation of text output for blind persons (Braille), and are, therefore, easily obtained.

One of the advantages of providing a sensor mat as the receptor is that the sensor mat can be procured cheaply as a mass-production item.

If the second layer is designed as a transparent sensor mat which, in addition, comes to be located immediately above the first layer, the mechanically flexible display medium is protected since it is no longer directly exposed to contact from a user. The life expectancy of the display medium, with its associated increased (procurement) costs when compared with the sensor mat, is increased.

Additional features and advantages of the present invention are described in, and will be apparent from, the following Detailed Description of the Invention and the Figures.

BRIEF DESCRIPTION OF THE FIGURES

FIG. 1 shows a side view of the layer structure of a touch-sensitive display with tactile feedback in accordance with the teachings of the present invention.

DETAILED DESCRIPTION OF THE INVENTION

FIG. 1 shows a side view of a display structured in three layers $S_1$, $S_2$ and $S_3$, whereby a transparent flexible sensor mat comes to be located in the first layer $S_1$.

This sensor mat is designed such that it detects contacts and generates at least one first signal which at least determines the location (Cartesian coordinates) of the contact.

Immediately above this first layer $S_1$ is located the second layer $S_2$ which is formed by a flexible plastic membrane and is designed using the technology known as electronic paper.

Electronic paper is the name used by experts for a technology which combines the advantages of flat screens and printer ink on paper, in which tiny color capsules containing at least two colors—(black and white, for example) are used and the one or the other of their sides is made to point upwards on a paper surface, depending on an electrical charge. So-called plastic transistors are intended for use in controlling the electrical field required for this purpose.

Alternative technologies known to experts are "organic electroluminescence membranes" or "microencapsulated electrophoretic displays" which similarly permit an embodiment in the form of flexible, extremely thin display media.

The use of this technology on a membrane which is designed to be mechanically flexible and elastic is intended for the arrangement according to the present invention in order that it can be mechanically manipulated in points so as to produce bulges on the surface of the membrane which are automatically returned to the normal state on termination of the mechanical manipulation.

Beneath the second layer $S_2$ is located the third layer $S_3$ which is formed by an area-covering matrix consisting of "knobs" $N_1 \ldots N_m$, designed as nylon or metal pins, which are arranged perpendicularly to the membrane surface and located so as to allow movement by piezoelectric operation.

In this situation, the three layers $S_1$, $S_2$ and $S_3$ are arranged in such a way that the piezoelectrically operated knobs $N_1 \ldots N_m$ are able to mechanically manipulate the first two layers $S_1$ and $S_2$ in points such that, in an initial state, keyboard delimitations and/or labels of a virtual keypad are generated on the surface of the second layer by knobs $N_1 \ldots N_m$ located beside one another, and can be felt by touch there. In this situation, the labeling can be generated in Braille in order for sighted users to have the opportunity to see a virtual keyboard and its functionality displayed on the display medium, where they are able to feel the keyboard delimitation, while at the same time visually impaired users have the capability to feel the keyboard functionality via the Braille generated by the knobs $N_1 \ldots N_m$.

At least the second layer $S_2$ and the third layer $S_3$ are connected to a control unit µP which is designed in such a way that it is implemented in an initial state, in other words a state in which no input has (yet) been made by contact; for example, a virtual keypad and/or a virtual menu bar resulting from the generation of at least one second signal, for controlling the knob matrix $N_1 \ldots N_m$. Furthermore, the control unit µP is designed in such a way that it generates at least one new second signal as a result of a contact on the sensor mat, whereby the contact must have taken place in a permitted area, in other words an area in which a virtual control element is displayed.

In addition, the control unit µP is also connected to another unit controlling the display, or forms a unit together with it, such that control signals for generating changes in the virtual control elements as a result of operator actions are also generated.

As an alternative to the sensor mat, a light grid also may be located in the second layer $S_2$.

Light grids generally consist of two transmitter strips arranged perpendicular to one another, each of which emits a number of light beams, and also receiver strips located opposite each transmitter strip, which detect the light beams. The light beams from the transmitter strips arranged perpendicular to one another cross in this situation and create a light grid. In the event of penetration of the light grid, the absence of at least one light beam on the receiver strips arranged perpendicular to one another is detected, in each case, in such a way that pairs of coordinates can be formed which serve to determine precisely the location of penetration. The coordinates ascertained then can be sent as a first signal to the control unit µP.

In this situation, the light grid is arranged in such a way above the first layer $S_1$ that the bulges in points on the display surface produced by the knob matrix $N_1 \ldots N_m$ do not interrupt any light beams.

Although the present invention has been described with reference to specific embodiments, those of skill in the art will recognize that changes may be made thereto without departing from the spirit and scope of the present invention as set forth in the hereafter appended claims.

The invention claimed is:

1. A touch-sensitive display with tactile feedback, comprising:
   a first layer with a mechanically flexible display medium;
   a second layer with at least one receptor, wherein the second layer is disposed such that the at least one receptor detects a contact in at least one section of the first layer and generates at least one first signal;
   a third layer with at least one controllable actuator, wherein the third layer is disposed such that the at least one controllable actuator mechanically manipulates the first layer at least in some points of the at least one section; and
   a control device which contacts the second layer and the third layer such that, in an initial stage, at least one second signal for controlling the at least one controllable actuator is generated, and at least one modified second signal is generated based on the first signal, wherein the at least one receptor is a second matrix arrangement of moveable pins which are at least one of electrically driven and mechanically driven, and wherein the moveable pins are movable perpendicular to a surface of the first layer.

2. A touch-sensitive display with tactile feedback as claimed in claim 1, wherein the display medium is a membrane designed in accordance with one of electronic paper technology, microencapsulated electrophoretic display technology and organic electroluminescence technology.

3. A touch-sensitive display with tactile feedback as claimed in claim 1, wherein the at least one receptor is a light grid.

4. A touch-sensitive display with tactile feedback as claimed in claim 1, wherein the at least one controllable actuator is a first matrix arrangement of moveable pins which are at least one of electrically driven and magnetically driven, and wherein the moveable pins can move perpendicular to a surface of the first layer.

5. A touch-sensitive display with tactile feedback as claimed in claim 4, wherein the moveable pins of the first and second matrix arrangements are piezoelectric elements.

6. A touch-sensitive display with tactile feedback as claimed in claim 4, wherein the moveable pins of the first and second matrix arrangements are electromagnetic elements.

7. A touch-sensitive display with tactile feedback as claimed in claim 1, wherein the second and third layers form a common layer, with the moveable pins of the first matrix arrangement and the moveable pins of the second matrix arrangement being located beside one another.

8. A touch-sensitive display with tactile feedback as claimed in claim 7, wherein the moveable pins of the first and second matrix arrangements act simultaneously as the at least one controllable actuator and the at least one receptor.

9. A touch-sensitive display with tactile feedback as claimed in claim 1, wherein the second layer is a sensor mat.

10. A touch-sensitive display with tactile feedback as claimed in claim 9, wherein the first layer is positioned beneath the second layer, with the second layer being transparent and flexible.

* * * * *